(12) United States Patent
Seto

(10) Patent No.: US 8,797,608 B2
(45) Date of Patent: Aug. 5, 2014

(54) IMAGE READING APPARATUS AND IMAGE FORMING APPARATUS

(75) Inventor: Masaki Seto, Gotemba (JP)

(73) Assignee: Canon Kabushiki Kaisha, Tokyo (JP)

( * ) Notice: Subject to any disclaimer, the term of this patent is extended or adjusted under 35 U.S.C. 154(b) by 530 days.

(21) Appl. No.: 12/630,753

(22) Filed: Dec. 3, 2009

(65) Prior Publication Data

US 2010/0142007 A1   Jun. 10, 2010

(30) Foreign Application Priority Data

Dec. 5, 2008   (JP) .................................. 2008-311232

(51) Int. Cl.
*H04N 1/04*   (2006.01)
(52) U.S. Cl.
USPC ............................ 358/474; 358/488; 358/486
(58) Field of Classification Search
USPC ................................. 358/474, 488
See application file for complete search history.

(56) References Cited

U.S. PATENT DOCUMENTS

| 6,178,274 | B1 | 1/2001 | Youda | |
|---|---|---|---|---|
| 2005/0128536 | A1* | 6/2005 | Yamanaka et al. | 358/488 |
| 2006/0182479 | A1* | 8/2006 | Miyake | 399/400 |
| 2009/0122359 | A1* | 5/2009 | Kondo et al. | 358/474 |

FOREIGN PATENT DOCUMENTS

| JP | 10-112771 | 4/1998 |
|---|---|---|
| JP | 2003-241328 A | 8/2003 |
| JP | 2004-297780 A | 10/2004 |
| JP | 2005-184069 | 7/2005 |
| JP | 2007-221589 A | 8/2007 |

* cited by examiner

*Primary Examiner* — Charlotte M Baker
*Assistant Examiner* — Rury Grisham
(74) *Attorney, Agent, or Firm* — Canon USA Inc. IP Division

(57) ABSTRACT

An image reading apparatus includes a reader unit configured to read an image of a conveyed document at a reading position, a transparent member arranged at the reading position and including a conductive layer, which is earthed, on a surface of the transparent member, a conveyance unit configured to convey the document to the reading position, and a guide member that is earthed, provided along the surface of the transparent member, and positioned so as to intersect with a conveyance direction of the document conveyed by the conveyance unit.

18 Claims, 13 Drawing Sheets

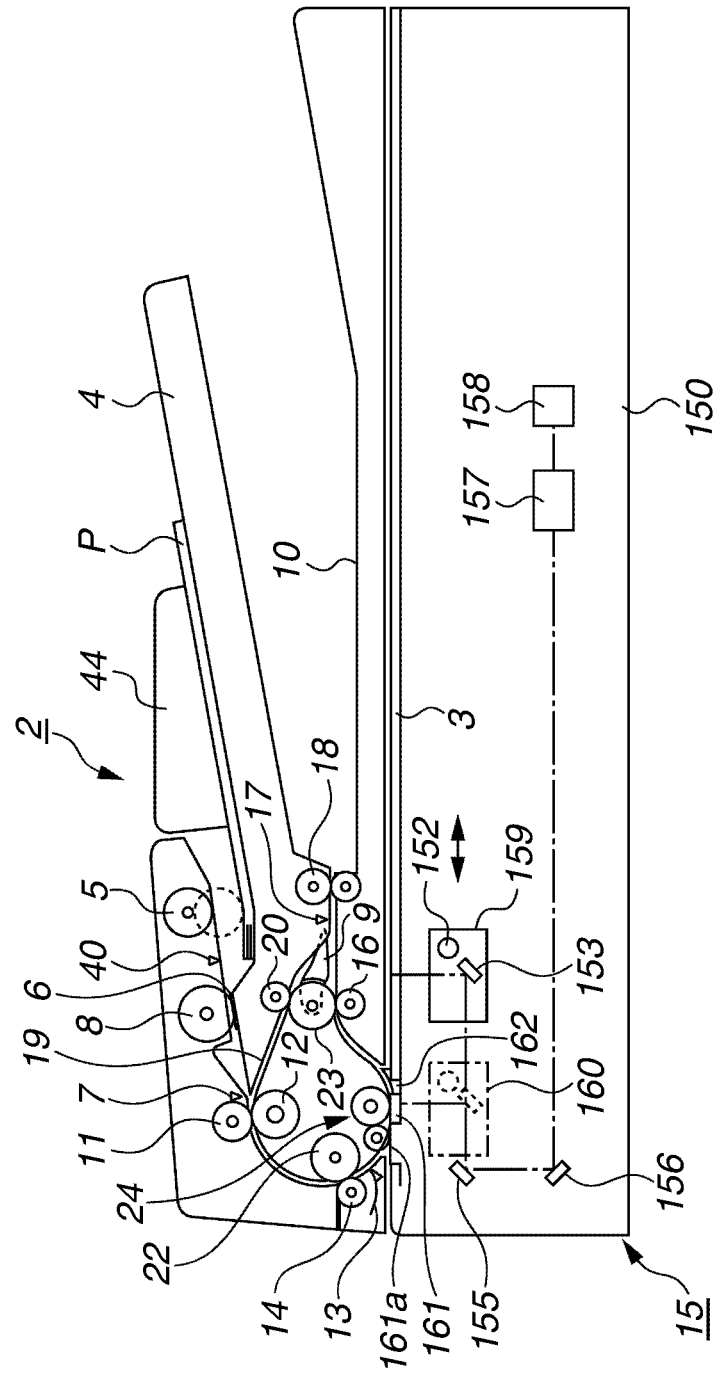

IMAGE READING APPARATUS AND IMAGE FORMING APPARATUS

BACKGROUND OF THE INVENTION

1. Field of the Invention

The present invention relates to an image reading apparatus for reading an image of a document.

2. Description of the Related Art

Conventionally, there have been image reading apparatuses having an automatic document feeder (hereinafter, referred to as ADF) used in image forming apparatuses such as digital copying machines. Such an image reading apparatus having the ADF moves and stops a reader unit provided below the ADF at a set position, that is, at a position approximately below a platen roller in the ADF, by a motor. Then, light is emitted from a lamp unit, the document is scanned while being conveyed between the platen roller and a glass plate, and the image is read by the by reader unit based on the reflected light.

As illustrated in FIG. 12, the document reader unit in the ADF of a conventional digital copying machine includes a platen roller 524 and a platen glass 516, which is a transparent document guide unit. A document P is conveyed in contact with the surface of the platen glass 516.

To ensure the conveyance properties of the document P, charging of the platen glass 516 is prevented by providing an earth spring (not illustrated) on the longitudinal direction (document width direction) end portion of the platen glass 516. However, there is a problem that dust, such as toner particles, paper dust, or rubber dust, produced by the document conveyance accumulates on the platen glass. In particular, if dust accumulates at the document reading position, a problem arises in that a streaky image is produced during image recording.

More specifically, as illustrated in FIG. 12, dust G conveyed with the document P slides between the document P and the platen glass 516. Thereafter, although the document P separates from the platen glass 516 and is conveyed along a conveyance guide 517, the dust G is electrostatically attracted to the platen glass 516, where it remains. At this stage, if the dust G is at a document reading position 99, the dust is continuously read by the reader unit during the reading operation of the document P. Consequently, image streaks are produced.

Japanese Patent Application Laid-Open No. 10-112771 discusses forming a thin film, which is transparent and conductive, on the glass surface of a contact image sensor.

Further, in the image reading apparatus (refer to FIG. 13), the platen glass 516 is coated with a conductive coating 516c on a document passage face of the platen glass 516. In addition, Japanese Patent Application Laid-Open No. 2005-184069 discusses preventing image streaks by sticking an aluminum sheet 516a extending in the width direction of the document, so that the static elimination effects are strengthened and the dust G is not electrostatically attracted to the platen glass 516.

According to the configuration discussed in Japanese Patent Application Laid-Open No. 2005-184069, dust G, such as paper dust, adhered to the document P is conveyed with the document P, and is slid between the platen glass 516 and the document P. The charge of the surface of the platen glass 516 is removed by the aluminum sheet 516a and a conductive layer (conductive coating) 516c on the surface of the platen glass 516. Consequently, the force of the electrostatic adsorption does not extend to among the document P, dust G, and platen glass 516, and the force due to friction becomes dominant.

Therefore, the frictional force between the document P and the dust G is stronger than the frictional force between the dust G and the platen glass 516, so that the dust G is conveyed with the document P. Consequently, the occurrence of image streaks due to the accumulation of the dust G on the platen glass 516 can be prevented.

Further, even if the dust G accumulates on the platen glass 516, as long as the dust G is not electrostatically attracted to the platen glass 516, the dust G is easily removed by the cleaning performed by the leading edge of the next document P, thereby preventing streaky images from being produced.

However, in recent years, there have been increasing demands placed on the ADF, such as faster reading speed (document conveyance speed), reduced size, and ability to handle various kinds of document passage.

For the demands concerning reducing the size of the apparatus, and especially for the passage of a thick document, in the configuration of the conventional apparatus illustrated in FIG. 13, the document is pressed against the platen glass with a strong abutting pressure as a result of a curved document-conveyance path and a very stiff thick document. This is because the document is conveyed in a direction intersecting the surface of the platen glass, from the upstream with respect to the platen glass in the conveyance direction.

Especially when thick paper of, for example, 200 g/cm$^2$ or more is repeatedly passed, the conductive coating peels off from the glass due to the document repeatedly sliding over the platen glass face at the same position on the platen glass face. The following problems arise if the conductive coating on the platen glass face is abraded.

Due to the abrasion of the conductive coating, the above-described static elimination effects are impaired. If paper is repeatedly passed in a state where the static elimination effects are impaired, dust adheres to the platen glass. Consequently, streak image defects will occur.

Further, due to the abrasion of the conductive coating, the reading luminance fluctuates during image reading. This is because the light transmittance of the platen glass differs depending on whether the conductive coating is present or not. The fluctuation of the reading luminance has an adverse effect on the output image density.

This problem can be dealt with by applying a correction to the reading luminance if the conductive coating is uniformly present on the platen glass. However, if the conductive coating is locally abraded, there will be some portions of blank glass from which the conductive coating is abraded and some reading portions on which the conductive coating is not abraded.

Consequently, a difference in the reading luminance will be produced between the image of a document read via a blank glass portion and the image of a document read via a portion on which the conductive coating is present. Thus, non-uniform image luminance data will be obtained.

Accordingly, due to the abrasion of the conductive coating, a difference in image density can occur between the portions from which the conductive coating is abraded and is not abraded as a result of fluctuations in the light transmittance when the paper passes over the platen glass.

SUMMARY OF THE INVENTION

The present invention is directed to an image reading apparatus capable of obtaining a good document image, and an image forming apparatus including the image reading apparatus.

According to an aspect of the present invention, an image reading apparatus includes a reader unit configured to read an image of a conveyed document at a reading position, a transparent member arranged at the reading position and including a conductive layer, which is earthed, on a surface of the transparent member, a conveyance unit configured to convey the document to the reading position, and a guide member that is earthed, provided along the surface of the transparent member, and positioned so as to intersect with a conveyance direction of the document conveyed by the conveyance unit.

According to an exemplary embodiment of the present invention, the guide member is positioned so as to intersect with a conveyance direction of the conveyance unit, which conveys the document. Consequently, abrasion of the conductive layer can be prevented, and a good document image can be obtained.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a cross-sectional view of an image reading apparatus according to another exemplary embodiment of the present invention.

DESCRIPTION OF THE EMBODIMENTS

The accompanying drawings, which are incorporated in and constitute a part of the specification, illustrate exemplary embodiments, features, and aspects of the invention and, together with the description, serve to explain the principles of the invention.

Figure 1:
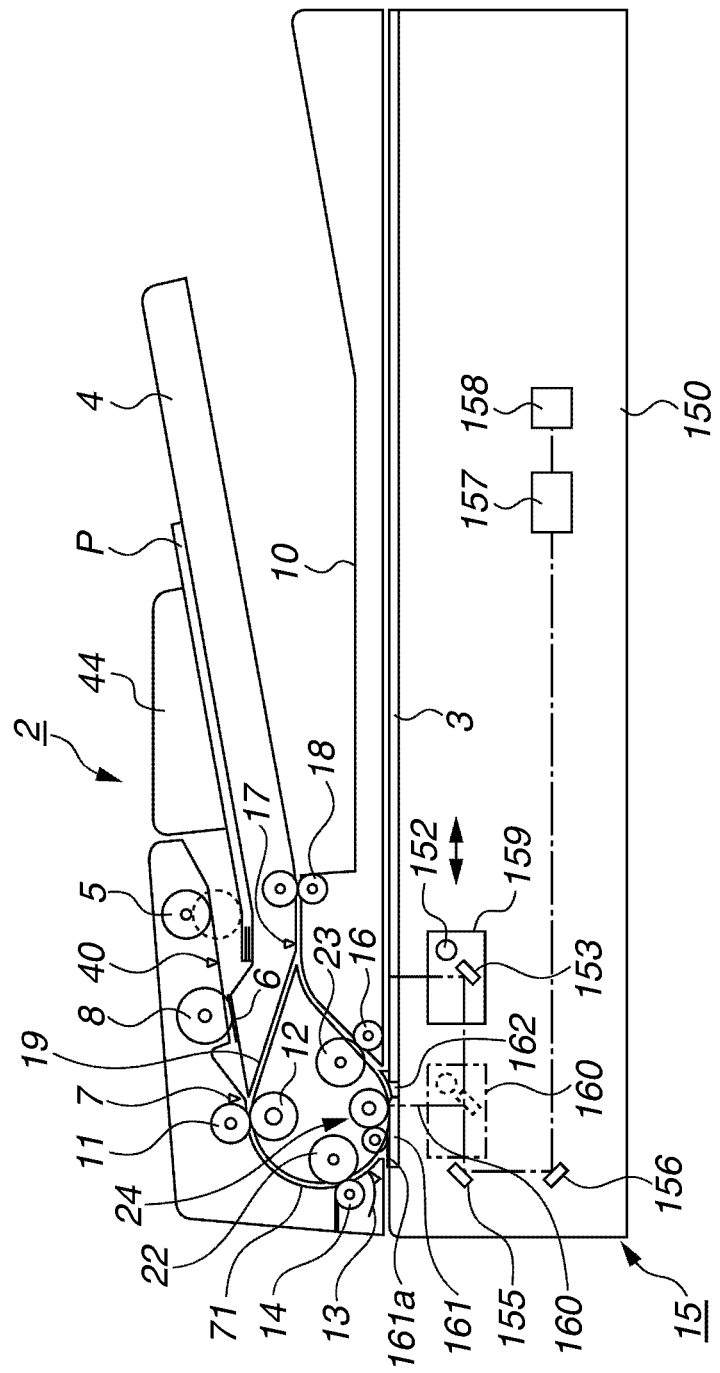
FIG. 1 is a cross-sectional view of an image reading apparatus according to an exemplary embodiment of the present invention.
Figure 2:
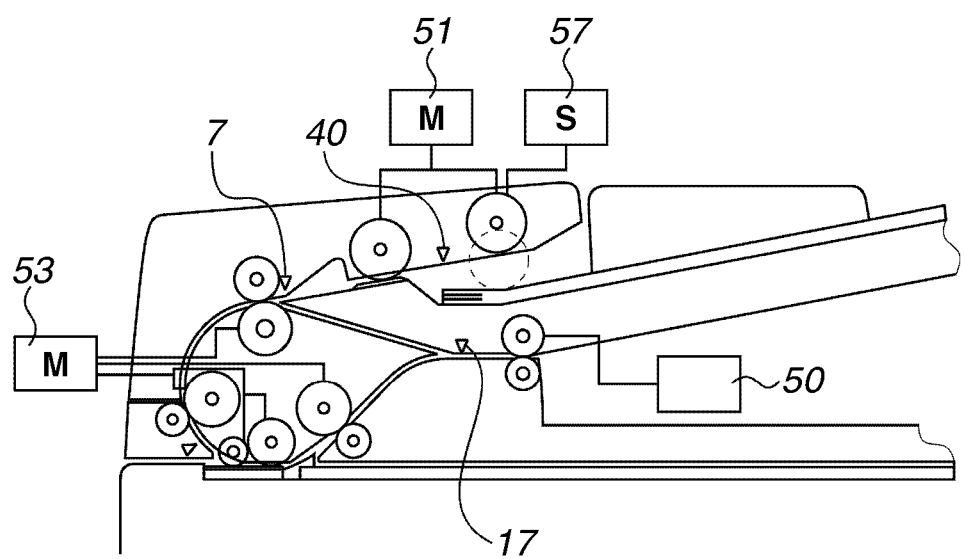
FIG. 2 illustrates a drive system of an automatic document feeder (ADF) according to the exemplary embodiment of the present invention.
Figure 3A:
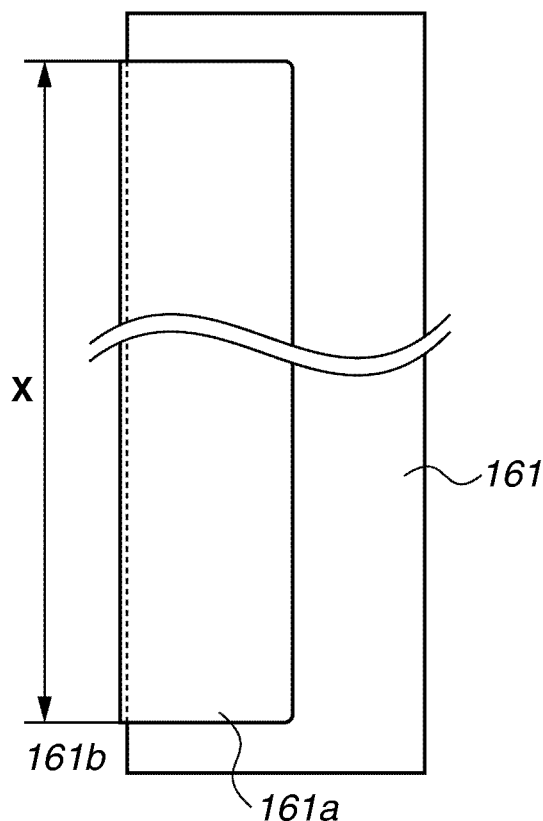
FIGS. 3A, 3B, and 3C illustrate details of a document reader unit according to the exemplary embodiment of the present invention.
Figure 3C:
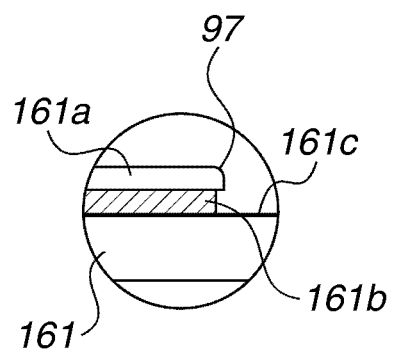
Figure 3B:
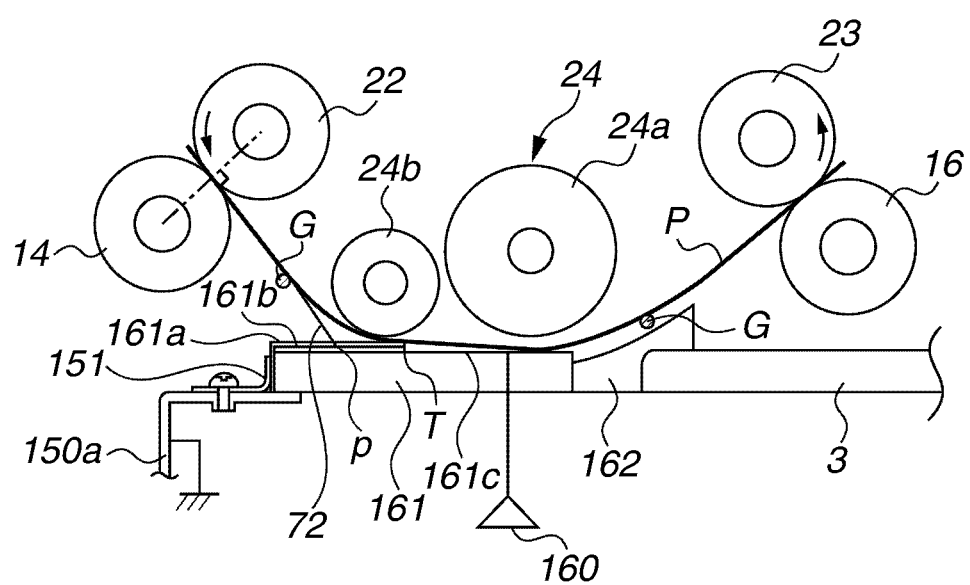
Figure 11:
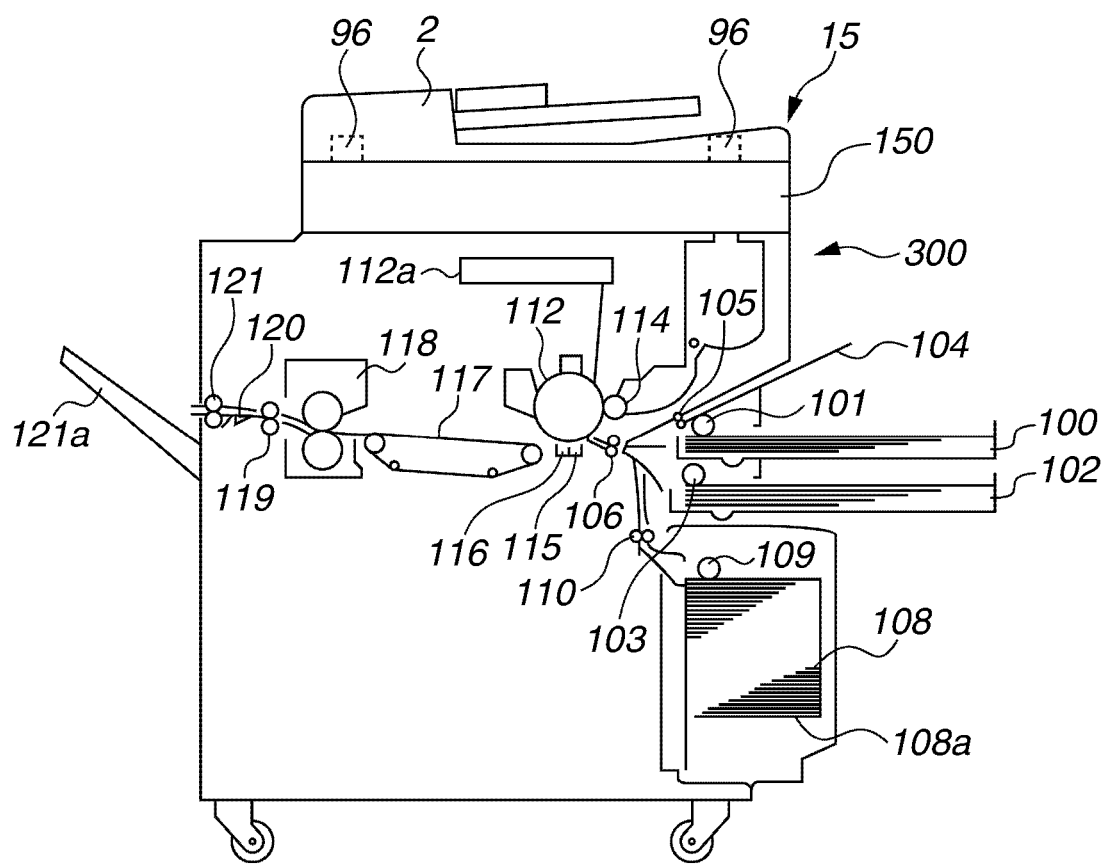
FIG. 11 is a cross-sectional view of an image forming apparatus according to the present invention.
Figure 12:
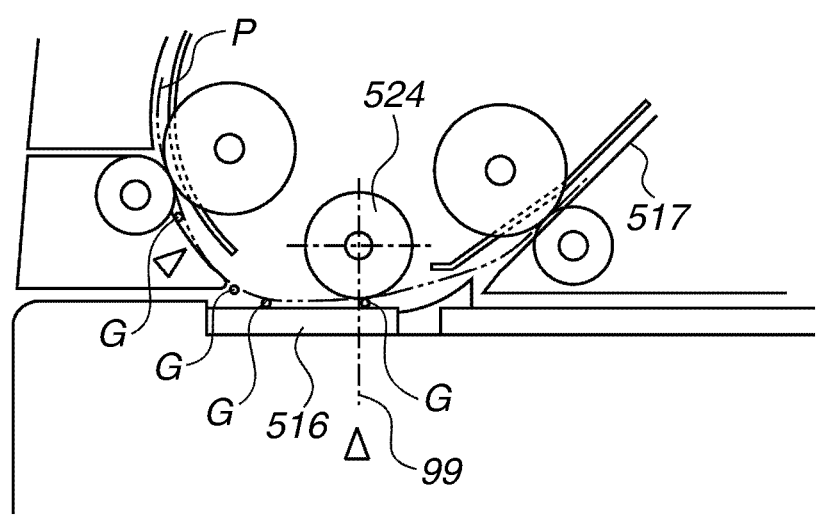
FIG. 12 illustrates a conventional configuration.

An image reading apparatus and an image forming apparatus including the same will now be described according to a first exemplary embodiment of the present invention. FIG. 11 is a configuration cross-sectional view of an image forming apparatus. FIG. 1 is a cross-sectional view of the image reading apparatus according to the present exemplary embodiment. FIG. 2 illustrates a drive system of an ADF. FIGS. 3A, 3B, and 3C illustrates details of a document reader unit.

Figure 4A:
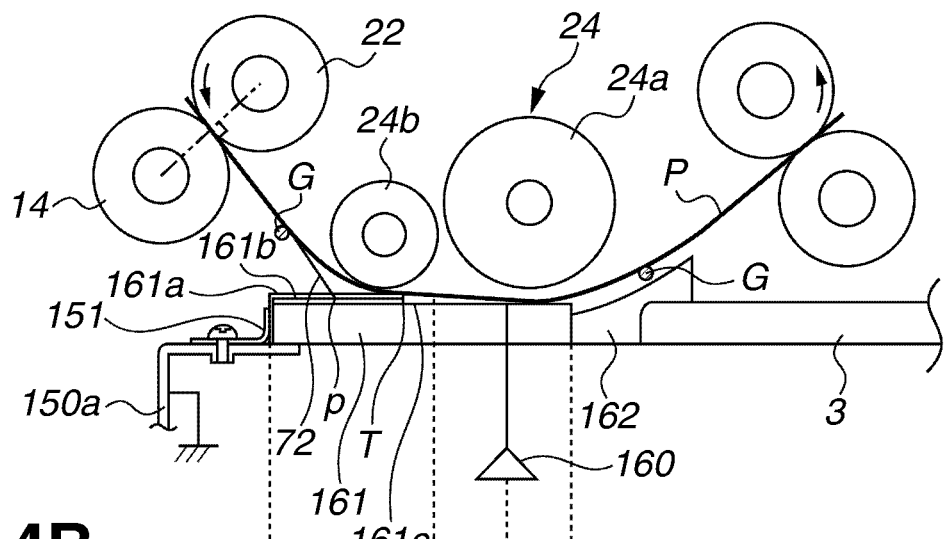
FIGS. 4A, 4B, and 4C illustrate measurement results of a document pressing force on a feeding-reading platen and measurement results of feeding-reading platen luminance after duration test according to the exemplary embodiment of the present invention and a conventional embodiment.
Figure 4B:
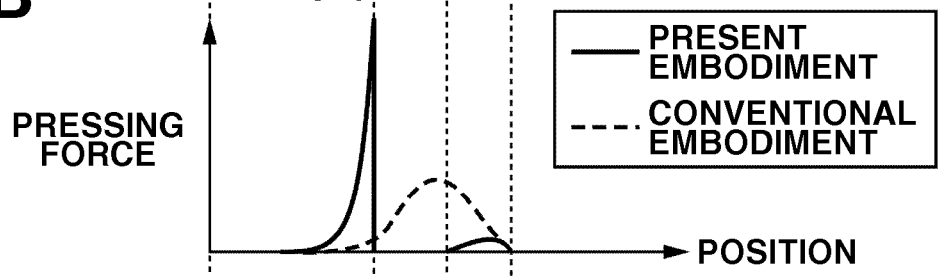
Figure 4C:
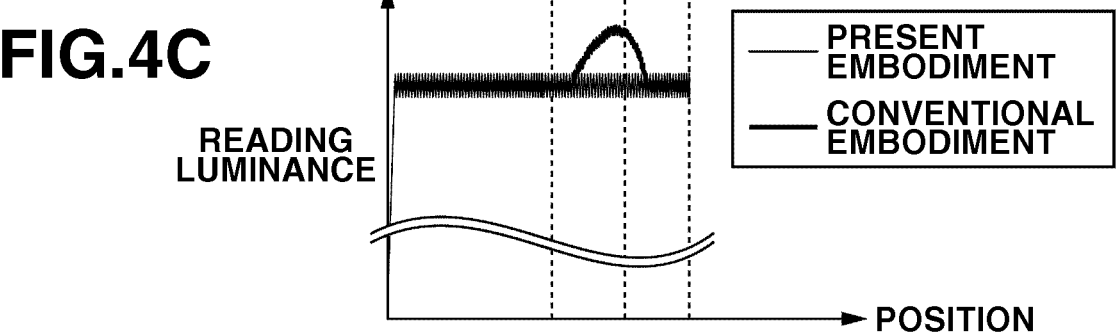

FIGS. 4A, 4B, and 4C illustrate measurement results of a document pressing force on a document reader unit and measurement results of a feeding-reading platen luminance.

Figure 6:
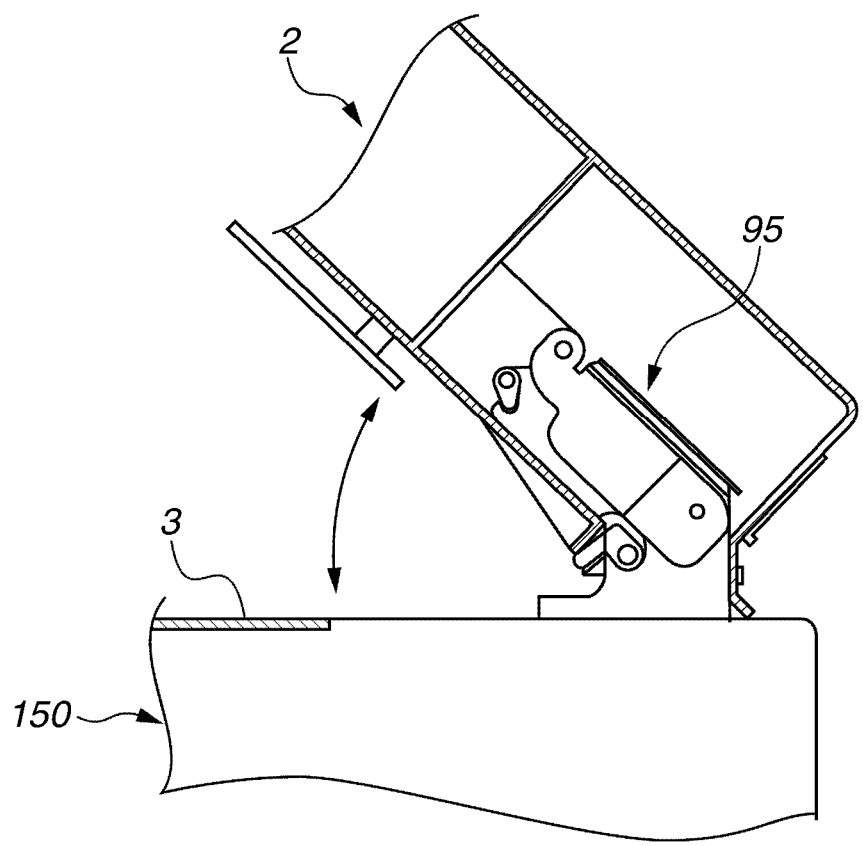
FIG. 6 illustrates a hinge mechanism of the ADF according to the exemplary embodiment of the present invention.
Figure 7:
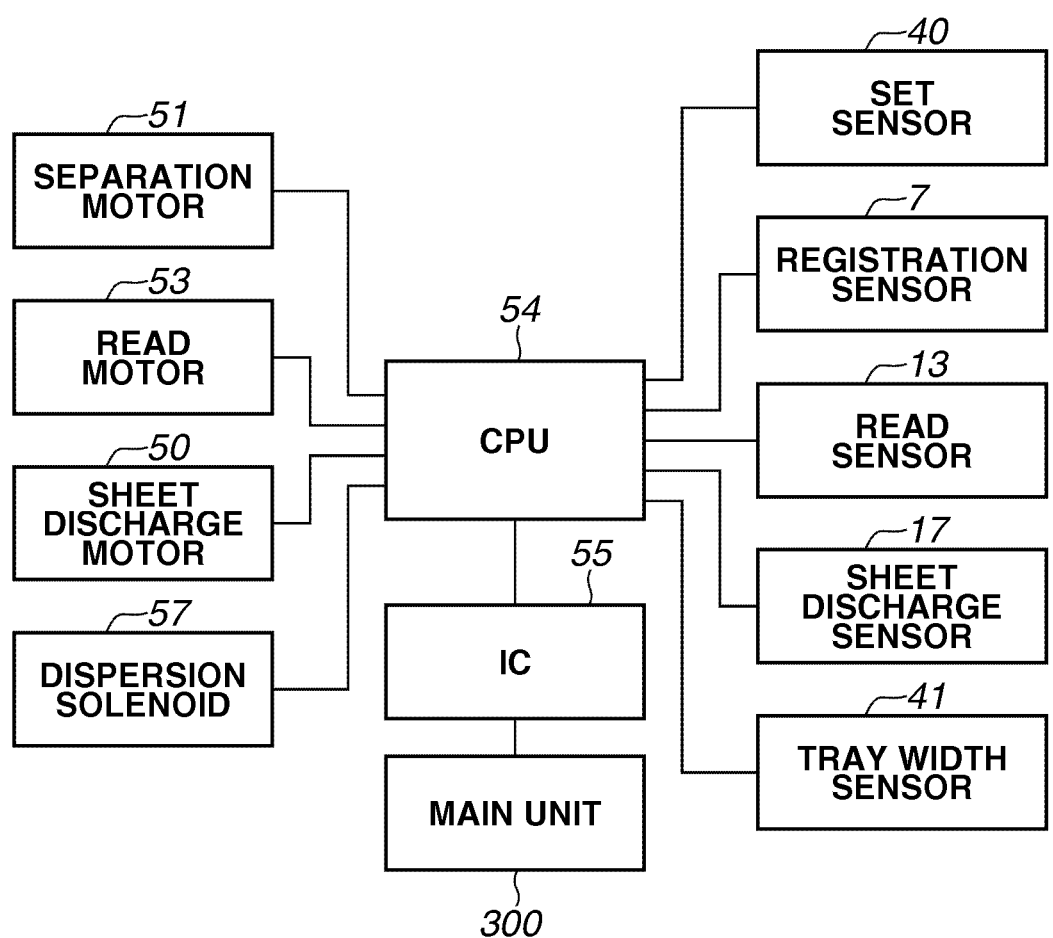
FIG. 7 is a control block diagram of the ADF according to the exemplary embodiment of the present invention.
Figure 8:
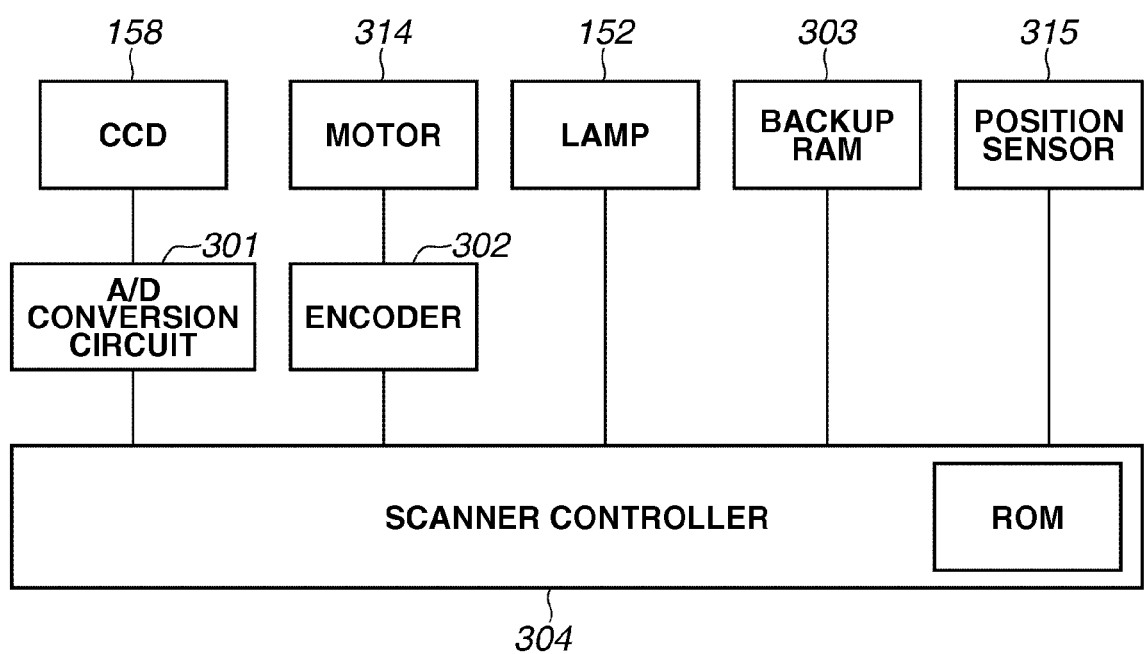
FIG. 8 is a control block diagram of an image reading unit according to the exemplary embodiment of the present invention.

FIG. 6 is a rear view of a hinge mechanism of the ADF. FIG. 7 is a control block diagram of the ADF. FIG. 8 is a control block diagram of a reader unit.

As illustrated in FIG. 11, an image forming apparatus 1 includes a printer unit 300 and an image reading apparatus 15.

The printer unit 300 is an image forming apparatus main body using known electrostatic latent image formation. The printer unit 300 includes a feeding unit, an image forming unit, and a fixing apparatus 118. The feeding unit includes an upper cassette 100, a lower cassette 102, a manual feeding guide 104, a sheet stacking unit 108, feeding rollers 101, 103, 105, 109, and a registration roller 106.

The upper cassette 100 can load and store recording sheets (i.e., recording medium). The recording sheets stored in the upper cassette 100 are individually separated and fed by the action of a separation claw and the feeding roller 101 so as to be guided to the registration roller 106.

The lower cassette 102 can load and store recording sheets. The recording sheets stored in the lower cassette 102 are individually separated and fed by the action of a separation claw and the feeding roller 103 so as to be guided to the registration roller 106.

The manual feeding guide 104 can load recording sheets. The recording sheets piled on the manual feeding guide 104 are individually guided to the registration roller 106 via the feeding roller 105.

The sheet stacking unit 108 (deck type) includes a middle plate 108a, which is raised and lowered by a motor or the like. The recording sheets piled on the middle plate 108a are individually separated and fed by the action of the feeding roller 109 and a separation claw so as to be guided to a conveyance roller 110.

The image forming unit for forming the image on the recording sheet includes a photosensitive drum 112, a laser scanner 112a, a developing device 114, a transfer charging device 115, and a separation charging device 116. The photosensitive drum 112 is irradiated with image light by the laser scanner 112a based on image data read by the reader unit 150, and an electrostatic latent image is formed on the surface of the photosensitive drum 112.

This electrostatic latent image is converted into a toner image by the developing device 114. The toner image is transferred by the transfer charging device 115 onto the recording sheet conveyed from the registration roller 106. The recording sheet onto which the toner image is transferred is separated from the photosensitive drum 112 by the separation charging device 116 and is conveyed to a conveyance belt 117.

Subsequently, the recording sheet is conveyed by the conveyance belt 117 to the fixing apparatus 118, and the toner image is fixed by the fixing apparatus 118. The recording sheet on which the toner image was fixed by the fixing apparatus 118 is conveyed through a sheet discharge path 120 by a sheet conveyance roller 119. Then, the recording sheet is discharged onto a discharge tray 121a by a discharge roller 121.

As illustrated in FIG. 1, the image reading apparatus 15 includes the reader unit 150 and an ADF 2 (auto document feeder (ADF)) provided above the reader unit 150.

As illustrated in FIG. 1, the reader unit 150 includes a lamp 152, a mirror 153, mirrors 155 and 156, a lens 157, and a charge coupled device (CCD) 158. The lamp 152 and the mirror 153 are attached to an optical bench 159.

The optical bench 159 is coupled with a motor 314 (see FIG. 8) by a wire (not illustrated) so as to be moved and controlled parallel to the platen glass 3 on which the document is placed by the motor 314.

A position sensor 315 (see FIG. 8) is a sensor for detecting a home position of the optical bench 159. The optical bench 159 is moved by the motor 314 being driven forwardly or reversely with reference to the position of the position sensor 315, so that the document on the platen glass 3 is optically scanned.

The motor 314 is configured by a stepping motor. The motor 314 is connected with an encoder 302, so that the number of pulses (corresponding to an amount of the movement of the optical bench 159) the optical bench 159 has been moved can be recognized based on the output of the encoder 302. More specifically, based on the position sensor 315 and the encoder pulses from the encoder 302, the position of the optical bench 159 can be grasped.

Light irradiated from the lamp 152 on the document surface is reflected by the document P. The reflected light from the document is guided to the lens 157 via the mirrors 153, 155, and 156 so as to be collected on the CCD 158 by the lens 157. The CCD 158 photoelectrically converts the reflected light, which contains the document information, and outputs the resultant signal as an electronic image signal. The lamp 152 and mirror 153, and the mirrors 155 and 156, lens 157, and CCD 158 constitute the reader unit of the present invention.

According to this configuration, the reader unit 150 can read document information in two modes, an ADF document reading mode and a platen glass document reading mode. The ADF document reading mode is a mode in which the document information is read while the document is conveyed by the ADF 2 in a state where the optical bench 159 is stopped at a reading position 160 (position shown by the dashed line in FIG. 1).

The platen glass document reading mode is a mode in which the document information is read with the document placed still on the platen glass 3 while the optical bench 159 is moved in a sub scanning direction orthogonal to the scanning direction (document width direction).

As illustrated in the block diagram of FIG. 8, the motor 314, encoder 302, and lamp 152 are connected to and controlled by the scanner controller 304, which also controls the reader unit 150. The position sensor 315 for positioning the optical bench 159 to the home position is also connected to the scanner controller 304.

The scanner controller 304 is connected to the lamp 152 irradiating light on the document surface, the CCD 158, an analog/digital (A/D) conversion circuit 301, and a backup random access memory (RAM) 303 for controlling the operations thereof. The backup RAM 303 is a storage memory for setting the standard reading position 160 in the ADF document reading mode.

As illustrated in FIG. 1, the ADF 2 includes a document tray 4, the feeding unit, and a separation unit (the feeding roller 5, separating pad 6, and separation conveyance roller 8). Further, the ADF 2 also includes the conveyance unit (registration driven roller 11, registration roller 12, read discharge roller 23, and read discharge driven roller 16), a curved conveyance path guide 71, and a discharge unit (discharge roller 18 and discharge tray 10). In addition, the ADF 2 includes various kinds of drive systems and sensors, control circuits, and a hinge mechanism 95 (see FIG. 6).

The feeding unit and separation unit are configured by the feeding roller 5, the separating pad 6, and the separation conveyance roller 8. The document tray 4 is used for storing sheet-like documents P. In the document tray 4, a pair of width direction regulating plates 44 for regulating the document width direction is arranged slidably in the document width direction. By regulating the width direction of the documents P piled on the document tray 4 by the width direction regulating plates 44, conveyance stability can be ensured during feeding.

The feeding roller 5 is arranged above the document tray 4. The feeding roller 5 is rotated by the rotation drive of the separation conveyance roller 8 so as to feed the sheet document. Since the feeding roller 5 is pivotably supported by an arm (not illustrated), the feeding roller 5 can be moved vertically by swinging the arm.

The feeding roller 5 is normally retracted upwards to a standby position (position illustrated in a solid line in FIG. 1), which serves as the home position, so as not to disturb the document setting operation. When the feeding operation is started, the feeding roller 5 is lowered and abuts the upper surface of the document P (position illustrated in dotted line in FIG. 1).

The separating pad 6 is arranged to face the separation conveyance roller 8 so as to apply pressure on the separation conveyance roller 8. The separating pad 6 is formed from a rubber material having a friction slightly smaller than that of the separation conveyance roller 8. The registration roller 12 and the registration driven roller 11 serve as a registration unit for aligning the leading edges of the documents fed by the separation conveying roller 8.

FIG. 2 illustrates a drive system including motors and a solenoid for driving each of the rollers. A separation solenoid 57 drives the swinging of the feeding roller 5. The separation solenoid 57 is a keep solenoid, which lifts up and holds the feeding roller 5 upward at the home position (position illustrated in solid line in the FIG. 2), which does not cause problems when setting the document. During the feeding operation, the keeping force of the separation solenoid 57 is turned off. Consequently, the separation solenoid 57 is lowered, and the feeding roller 5 presses against the uppermost sheet of the sheet documents on the document tray 4.

A separation motor 51 is a stepping motor for rotating and driving the separation conveyance roller 8 and the feeding roller 5 in the conveyance direction. A read motor 53 is a stepping motor for driving the registration roller 12, the read roller 22, the platen roller 24, and the read discharge roller 23. The read motor 53 drives the rollers at a speed corresponding to that of reading the image on the conveyed document. A discharge motor 50 is a stepping motor for driving the discharge roller 18.

The document tray 4 is provided with a document set detecting sensor 40, which is a transmissive optical sensor, for detecting that the sheet document P is set. Further, a document width detecting sensor 41 (not illustrated) for detecting the length in the width direction of a stack of the documents P set on the document tray 4 by detecting the position of the width direction limiting plate 44 is provided on a lower portion of the document tray 4.

A registration sensor 7, which is a transmissive type optical sensor, for detecting the document is provided between the separation conveyance roller 8 and the registration roller 12. The registration sensor 7 detects the leading edge of the separated and conveyed document, and the timing for controlling the abutting amount (loop amount) against the registration roller 12.

A read sensor 13, which is a reflective optical sensor, for detecting the document is provided immediately after the read roller 22. The read sensor 13 provided a reference signal for the image reading start timing at the reading position 160. A discharge sensor 17, which is a transmissive optical sensor, for detecting the document is provided immediately before the discharge roller 18. The discharge sensor 17 detects the discharge timing of the document.

As illustrated in FIG. 7, a control circuit of the ADF 2 is mainly configured by a central processing unit (CPU) 54. Drive circuits and sensor signals of various loads are connected to the input and output ports of the CPU 54.

The control circuit also includes a RAM (not illustrated) backed up by a battery and a read only memory (ROM) (not illustrated) in which control sequence software is stored. Further, a communication integrated circuit (IC) 55 controls data communication with the printer unit 300.

The separation motor 51, the read motor 53, and the discharge motor 50 are driven by the respective stepping motor drivers. A phase excitation signal and a motor current control signal are input to each driver from the CPU 54. The separation solenoid 57 is driven by the driver so that the operation is controlled by the signal output from the input/output port of the CPU 54.

The various sensors, such as the registration sensor 7, the set sensor 40, the read sensor 13, the discharge sensor 17, and the document width sensor 41, are connected to the input port of the CPU 54. These sensors are used for monitoring the behavior of the document and the behavior of the movable load in the apparatus.

When the document P on the document tray 4 is detected by the set sensor 40, the feeding roller 5 is lowered so as to abut the document stack. If the copying conditions are input by the operation unit of the image forming apparatus 1 and a start key is pressed, the document size is detected by the document width sensor 41 on the document tray 4.

Further, when the holding of the separation solenoid 57 is released, the documents receive a feeding force from the feeding roller 5 and are fed toward the downstream portion (toward the separation conveyance roller 8). The documents are individually separated by the separating pad 6 and the separation conveyance roller 8, and then fed to the registration driven roller 11 and the registration roller 12.

The leading edge of the document P separated and fed from the separation conveyance roller 8 is made to abut a nip portion of the stationary registration roller pair 11 and 12. Simultaneously, the trailing edge of the document is fed by the separation conveyance roller 8. Consequently, the document P is looped and its leading edge is aligned.

The document P with its leading edge aligned is fed by the registration roller pair 11 and 12 to the read roller pair 22 and 14 configured by the read roller 22 and the read driven roller 14. Further, the document P is conveyed toward the platen roller 24 by the read roller pair 22 and 14 serving as the conveyance unit for conveying the document to the platen glass 161.

At this time, the image is read at the reading position 160 when the document P passes over the surface of the feeding-reading platen 161, which is a transparent member provided between the platen roller 24 and the mirror 153. The document P, having had its image read at the reading position 160 on the feeding-reading platen 161, is guided so as to be picked up from the feeding-reading platen 161 by a jump plate 162.

The document guided by the jump plate 162 is conveyed to the discharge roller 18 by the read discharge roller 23 and the read discharge driven roller 16, and is discharged to the discharge tray 10.

During a double-sided reading mode, in which both sides of the document are read, the document P is switched back by the discharge roller 18, guided to an upward double-sided path 19, and then fed toward the registration roller pair 11 and 12. After being fed to the registration roller pair 11 and 12, the rear side of the document is read in the same manner as described above. Then, the document is discharged to the discharge tray 10.

As illustrated in FIG. 6, the ADF 2 is arranged rotatable with respect to the reader unit 150 by the hinge mechanism 95 so that the feeding-reading platen 161 and the platen glass 3 are open.

FIGS. 3A, 3B, and 3C illustrate the configuration of a document reader unit. FIG. 3A is a top perspective view of the feeding-reading platen 161 and a conductive conveyance guide 161a. FIG. 3B is a cross-sectional view of the document reader unit. FIG. 3C is an enlarged cross-sectional view of a downstream side end portion of the conductive conveyance guide 161a.

As illustrated in FIG. 3B, the document reader unit includes the platen roller 24, the feeding-reading platen 161, and the conductive conveyance guide 161a (a conductive guide member).

The platen roller 24 includes a white platen roller 24a and a sheet pressing roller 24b. The sheet pressing roller 24b acts as a regulating unit for regulating the movement in which the conveyed document separates from the conductive conveyance guide 161a (rises up from the conductive conveyance guide 161a).

The white platen roller 24a is rotated to convey the document P in the conveying direction by a drive unit (not illustrated). A clearance between the white platen roller 24a and the feeding-reading platen 161 (transparent member) is guaranteed to be 0.3 mm by a clearance holding structure (not illustrated).

The conductive conveyance guide 161a is adhered to the feeding-reading platen 161. The sheet pressing roller 24b is configured to be capable of swinging around the shaft of the read roller 22. The sheet pressing roller 24b is pressed on by a spring in a direction for applying the pressure on the feeding-reading platen 161. The sheet pressing roller 24b is a rotating member being in contact with the conveyed document and rotated by the document.

The feeding-reading platen 161 is coated with an electro-conductive (EC) coat 161c on the glass surface as a conductive layer, and has a surface resistance of about 200 to 500 $\Omega$/cm. The EC coat is a transparent conductive coating. In the present exemplary embodiment, a surface film layer is produced to a thickness of about 1 μm or less by vapor deposition with a visible light transmittance of about 90% (at wavelength about 500 μm).

On the surface of the feeding-reading platen 161, the conductive conveyance guide 161a (a conductive member) is adhered to an edge portion on the upstream side in the document conveyance direction using a conductive double-sided tape 161b. The conductive conveyance guide 161a is in contact with an earth spring 151, which is fixed by a screw to an earthed chassis 150a. Therefore, the conductive conveyance guide 161a is earthed via the chassis 150a and the earth spring 151 arranged on the chassis 150a.

Since the surface of the feeding-reading platen 161 (the EC coat 161c of the surface layer) is adhered by the conductive double-sided tape 161b (i.e., conductive adhesive member), the surface of the feeding-reading platen 161 is in a conductive state with the conductive conveyance guide 161a. Therefore, the EC coat 161c, which is a conductive layer, is earthed via the conductive conveyance guide 161a.

In the present exemplary embodiment, a SUS plate material with a thickness of 0.1 mm is employed as the conductive conveyance guide 161a. The thickness of the conductive double-sided tape 161b is about 0.1 mm. A length "X" in the longitudinal direction (document width direction) of the conductive conveyance guide 161a is set to be equal to or greater than the maximum document width to be conveyed. The electrical resistance of the conductive conveyance guide 161a formed by the SUS plate material is less than the electrical resistance of the EC coat 161c of the feeding-reading platen 161.

As illustrated in FIG. 3C, the document passage face side on the downstream side end portion of the conductive conveyance guide 161a has a round shape (R shape) 97 formed thereon. More specifically, the face, which will be the sagging edge side when the SUS plate undergoes press-work, is used as the guidance face side. Thus, by forming the document passage surface side of the end portion of the conductive conveyance guide 161a as the round shape 97, jamming resulting from the conveyed document being caught and damage to the conveyed document can be prevented.

Further, by forming the end portion of the conductive conveyance guide 161a as a round shape, paper dust due to the document rubbing against the end portion of the conductive conveyance guide 161a is prevented from being produced. The similar effects to that of the round shape may also be obtained by forming a tapered shape on the document passage face side of the end portion of the conductive conveyance guide 161a.

As illustrated in FIG. 3B, an intersection p is the point where a nip line 72 of the read roller pair 22 and 14 intersects with the surface of the feeding-reading platen 161. The conductive conveyance guide 161a is arranged from the upstream side of the intersection p in the document conveyance direction, extending toward the downstream side of the intersection p across the intersection p. More specifically, the position of an end portion T of the conductive conveyance guide 161a on the downstream side in the document conveyance direction is located in the downstream side of the intersection p.

Thus, the nip line 72 of the read roller pair 22 and 14, which is the conveyance direction of the document by the ADF 2 at directly the upstream of the feeding-reading platen 161, intersects with the conductive conveyance guide 161a extending along the surface of the feeding-reading platen 161. Further, the whole area of the conveyed document is in contact with the conductive conveyance guide 161a.

The end portion T of the conductive conveyance guide 161a on the downstream side in the document conveyance direction is positioned in the upstream of the reading position 160 in the document conveyance direction. In the present exemplary embodiment, the end portion T of the conductive conveyance guide 161a on the downstream side in the document conveyance direction is positioned about 4 to 6 mm further than the reading position 160 in the upstream direction.

As illustrated in FIG. 3B, with the current demands to make the ADF configuration more compact, in the popular U-shape conveyance path type configuration, the image feeding-reader unit is formed in the above-described curved conveyance path.

Therefore, if the feeding-reading platen 161 is arranged in a curved path like in the conventional configuration (see FIGS. 13A and 13B), the pressing force of the conveyed document on the feeding-reading platen increases in proportion to the increase in the document thickness and the increase in the conveyance path curvature.

If the above-described ED coat with a thickness of about 1 µm is subjected to repeated passage of documents with the document sliding resulting from the increased pressing force, the EC coat can be abraded and peel off from the feeding-reading platen 161.

The EC coat 161c, which is the surface layer film, causes the received luminance to decrease by about 10% compared with the visible light transmittance in a blank glass state. Therefore, due to the abrasion of the EC coat caused by the sliding with the document, a difference in the received luminance with the non-abraded portions is produced. Consequently, for example, this can cause a difference in image density of the print output based on the read image. Further, if the EC coat is repeatedly abraded, a difference occurs between the initial received luminance and the later received luminance, which causes fluctuation in the output image density over time.

In view of such problems with the conventional configuration, in the present exemplary embodiment, the conductive conveyance guide 161a is arranged on the feeding-reading platen 161. Further, the document is actively urged against the conductive conveyance guide 161a so as to slide along the conductive conveyance guide 161a by the document pressing force resulting from the curvature of the document.

Therefore, compared with the conventional configuration (see FIGS. 13A and 13B), the electrical contact of the document strengthens, and the ability to remove the static electricity of the document P and the dust G is substantially increased.

The ability to remove the static electricity of the document P and the dust G is further increased by urging the document to slide along the conductive conveyance guide 161a with a strong urging force using the pressing force generated by the sheet pressing roller 24b. Further, even for passage of a thin document, which has a low document pressing force generated due to its curvature, the ability to eliminate static electricity is increased by increasing the conduction with the conductive conveyance guide 161a by the urging force of the sheet pressing roller 24b.

Further, the pressing force of the document near the reading position 160 on the feeding-reading platen 161 coated with an EC coat can be substantially reduced by actively pressing the document on the conductive conveyance guide 161a so that the document is slid and conveyed. The reason for this is that because the conductive conveyance guide 161a receives the pressing force caused by the stiffness of the document resulting from the curved conveyance path, the document pressing force is reduced or absent near the reading position 160 on the feeding-reading platen 161, which is located on further downstream side of the conductive conveyance guide 161a.

More specifically, the document conveyed in a sloping downwards direction by the read roller pair 22 and 14 is guided toward the feeding-reading platen 161 coated with the EC 161c on its upper face by the upper face of the conductive conveyance guide 161a, which is parallel to the surface of the feeding-reading platen 161.

When the document is guided by the upper face of the conductive conveyance guide 161a, the movement direction of the document is deflected in a direction parallel to the upper face of the feeding-reading platen 161. Therefore, the contact force between the upper face of the feeding-reading platen 161 and the document is small.

Further, in the present exemplary embodiment, the rising up from the conductive conveyance guide 161*a* of the document guided by the conductive conveyance guide 161*a* is regulated by the sheet pressing roller 24*b* provided at a position facing the conductive conveyance guide 161*a*.

Therefore, on the downstream side of the conductive conveyance guide 161*a* in the conveyance direction, as the document conveyance orientation, conveyance of the document at an angle to the upper face of the feeding-reading platen 161 is less frequent. Consequently, the contact force between the upper face of the feeding-reading platen 161 and the document decreases.

As described above, the conductive conveyance guide 161*a* is provided extending along the surface of the feeding-reading platen 161 so as to intersect the nip line 72 formed between the read roller 22 and the read driven roller 14. This configuration allows the static elimination of the document to be performed effectively as a result of the pressing on the conductive conveyance guide 161*a* generated due to the stiffness of the document conveyed along the curved conveyance path. Further, the pressing of the document on the feeding-reading platen 161 due to the stiffness of the conveyed document can also be prevented.

In the present exemplary embodiment, an example is described in which the conveyance direction of the document toward the feeding-reading platen 161 by the ADF 2 is regulated based on the nip line formed by the read roller pair 22 and 14. However, for example, the document may also be conveyed toward the feeding-reading platen 161 while regulating the position of the conveyed document by a pair of conveyance guides provided in the ADF between the read roller pair 22 and 14, and the feeding-reading platen 161.

In such a configuration, the conductive conveyance guide 161*a* may also be disposed so as to intersect with the conveyance direction of the document, which has its position regulated by the pair of conveyance guide pair between the read roller pair 22 and 14, and the feeding-reading platen 161.

Further, in the present exemplary embodiment, the sheet pressing roller 24*b* is disposed at a position facing the conductive conveyance guide 161*a*. This allows the pressing of the document on the conductive conveyance guide 161*a* by the sheet pressing roller 24*b* to be performed more reliably, and the static elimination of the document to be performed reliably.

Since the document static elimination effects are improved by the sheet pressing roller 24*b*, and the rising up of the conveyed document from the conductive conveyance guide 161*a* is regulated by the sheet pressing roller 24*b*, the pressing of the document on the upper face of the feeding-reading platen due to the stiffness of the document can also be prevented.

Figure 13A:
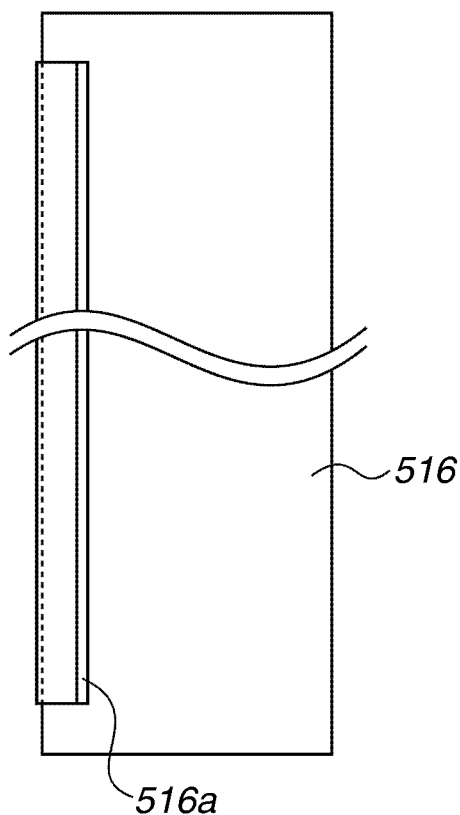
FIGS. 13A and 13B illustrate a conventional configuration.
Figure 13B:
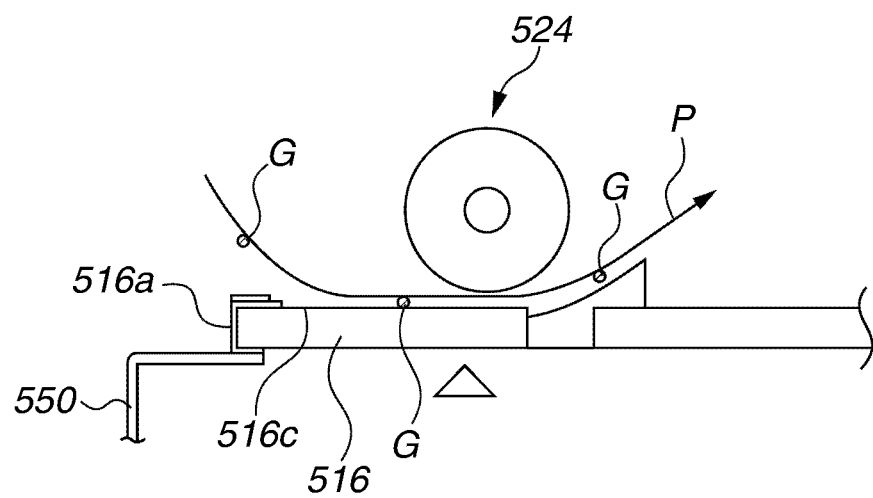

FIGS. 4A, 4B, and 4C illustrate the results of a comparison measurement of the present exemplary embodiment and the conventional embodiment (see FIGS. 13A and 13B).

FIG. 4B illustrates the results of actually measured pressing strength distributions of the document on the feeding-reading platen 161 surface during a document conveyance in the present exemplary embodiment and in the conventional embodiment. FIG. 4C illustrates the measurement results of transmission luminance (reading luminance) of the feeding-reading platen 161 when 100,000 sheets of paper were actually passed in the present exemplary embodiment and in the conventional embodiment. FIG. 4A is a cross-sectional view of the image reading apparatus, which is illustrated by associating the position in the document conveyance direction of the image reading apparatus with the horizontal axis in FIGS. 4B and 4C.

It can be seen from FIG. 4B that in the document pressing distribution of the conventional embodiment, the pressing force is high especially near the reading position. Further, in the document pressing distribution of the present exemplary embodiment, as described above, it can be seen that a high pressing force is concentrated at the edge portion on the downstream side of the conductive conveyance guide, and the document pressing force is substantially reduced near the reading position.

In FIG. 4C, the vertical axis represents the luminance obtained by irradiating light emitted from the lamp 152 of the optical bench 159 on a sheet of white reference paper placed on the glass upper face, collecting reflected light with a CCD 158, and converting the collected light into a luminance value. The horizontal axis represents the movement amount that the optical bench 159 is moved in a horizontal direction with the feeding-reading platen fixed.

From the measurement results of FIG. 4C, it can be seen that the luminance level increases near the reading position 160 of the feeding-reading platen of the conventional embodiment. Further, it can be seen that the feeding-reading platen 161 lacks conductivity even if the surface electrical resistance at the position where the luminance level is increased is measured. This suggests that the EC coat 161*c* is peeled off.

However, for the feeding-reading platen 161 according to the present exemplary embodiment, hardly any difference in the reading luminance level is produced. It can thus be understood that the EC coat 161*c* is not abraded even after repeated document passage.

Thus, in the conventional embodiment, the EC coat 161*c* on the surface of the feeding-reading platen 161 peels off near the portion where the pressing force is high. However, it can be seen that the EC coat does not peel off even after repeated document passage, if the pressing force of the document at the downstream end portion of the conductive conveyance guide 161*a* is concentrated by providing the conductive conveyance guide 161*a* like the present exemplary embodiment, so that the document is conveyed with a reduced pressure near the image reading position.

As described above, by reducing the pressing force of the document on the glass face near the reading position on which the EC coat 161*c* is coated, abrasion of the EC coat after repeated document passage can be substantially reduced. Therefore, image streaks caused by deterioration of the static elimination performance and defective images and image quality deterioration caused by fluctuations in image density due to difference in the transmission of the EC coat and the blank glass can be prevented even after the repeated document passage.

With the reduction in the pressing force of the document on the feeding-reading platen 161 near the reading position 160 of the image, there is also an effect of a reduction in the amount of static electricity produced near the reading position 160. More specifically, it is more difficult for image streaks to occur since the electrostatic energy conferred on the dust G is also reduced. In addition, as described above, by actively making the document abut the conductive conveyance guide 161*a*, which has a high conductivity, to eliminate static electricity, the initial dust static elimination performance is also increased, which allows the occurrence of image streaks to be suppressed more.

In practice, the occurrence of image streaks due to repeated document passage was dramatically improved compared with the incidence of image streak in the conventional embodiment.

In the present exemplary embodiment, the conductive conveyance guide 161a is formed by a SUS material. However, the present invention is not limited to this. Materials other than a SUS plate, such as a metal plate made from copper, aluminum, and the like, or other parts having a high conductivity, may also be used.

Further, the present exemplary embodiment is described using an example in which the conductive double-sided tape 161b is adhered on the conductive conveyance guide 161a by arranging the conductive double-sided tape 161b between the feeding-reading platen 161 and the conductive conveyance guide 161a. However, the present invention may also be configured so that the conductive conveyance guide 161a may also be in direct contact with the feeding-reading platen 161.

Further, the conductive conveyance guide may be directly adhered to the feeding-reading platen 161 as a conductive tape. Still further, the conductive conveyance guide may be a plate spring. Moreover, in the present exemplary embodiment, while a configuration is described in which the conductive conveyance guide 161a is earthed via the earth spring 151, the conductive conveyance guide may also be directly earthed.

Modified examples of the above exemplary embodiment will now be described below.

In the above-described exemplary embodiment, there is a difference (step) between the height of the document passage face of the conductive conveyance guide 161a and that of the feeding-reading platen 161. If the amount of this step is large, the problem can arise that a defective image is obtained in which the read image is blurred in the conveyance direction due to the shock of leaving the step when the rear end of the document passes through the step at the downstream end portion of the conductive conveyance guide 161a. This problem may be greater especially for thick document passage.

Figure 5A:
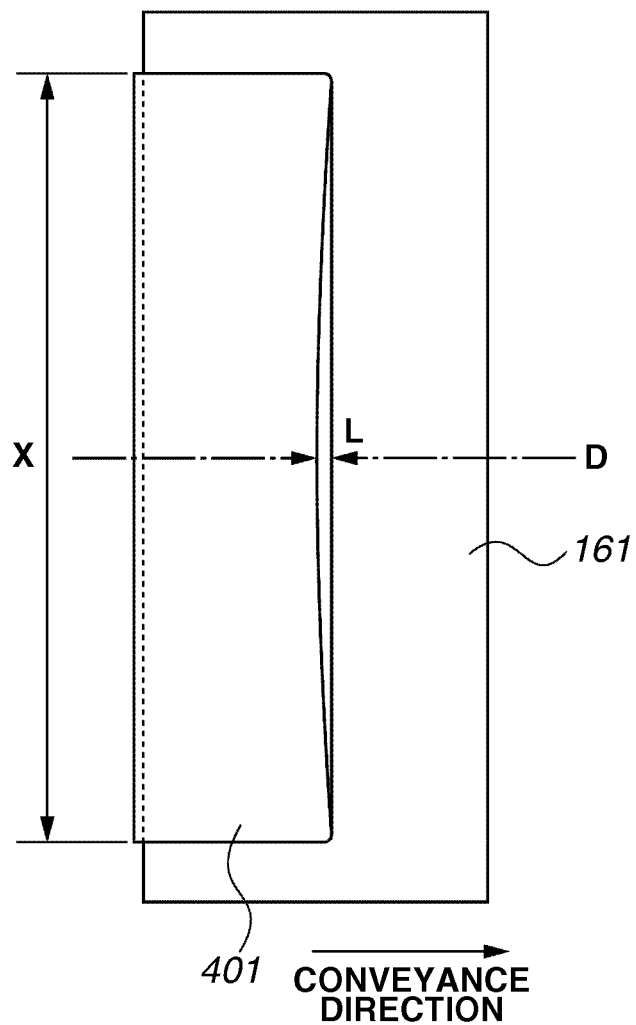
FIGS. 5A, 5B, 5C, and 5D illustrate details of a downstream end portion shape of a conductive guide member according to the exemplary embodiment of the present invention.

Thus, the above-described trailing edge leaving shock can be reduced by making, as illustrated in FIG. 5A, a ridge line in an orthogonal direction to conveyance on the downstream side end of the conductive conveyance guide 161a to be a "V" shape, which is symmetrical about the conveyance center line D. More specifically, a conductive conveyance guide 401 is provided in which the end position of the conveyance center line D in the conveyance direction is a ridge line, which is inclined to the upstream side by L (mm) from the end positions of the conductive conveyance guide in the end conveyance direction at the near side and the far side thereof.

By configuring in this manner, the problem of image streaks caused by dust and the problem of image blur caused by a shock can be reduced. The ridge line of the conductive conveyance guide on the downstream side end does not necessarily have to be a V shape. This ridge line may be a curved shape, for example, as long as the end position in the conveyance direction is different across the width direction of the document, which intersects the conveyance direction.

Figure 5B:
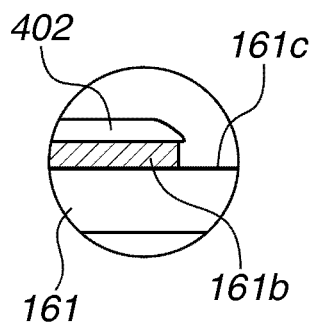
Figure 5C:
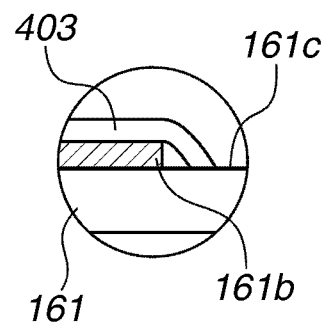
Figure 5D:
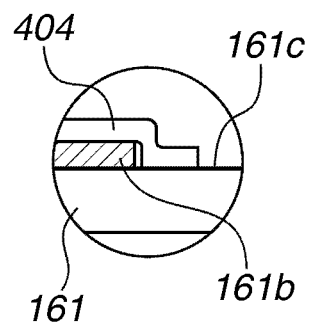

FIGS. 5B to 5D are both enlarged cross-sectional views illustrating modified examples concerning the shape of the downstream side end portion of the conductive conveyance guide. A conductive end portion tapered guide 402 having a cross-section with an inclined taper may be provided on the downstream side end portion, as illustrated in FIG. 5B, or an end portion L-shape conveyance guide 403 having a curved L shape, as illustrated in FIG. 5C, may be provided on the downstream side end portion.

Further, the effects of reducing the problem of image blur can also be achieved by, as illustrated in FIG. 5D, using an end portion two-stage curved guide 404, which forms a cross-section with a two-stage curve form to reduce the size of the step.

As described above, in the image reader unit for reading the image of the document conveyed along a curved conveyance path, the conductive conveyance guide 161a is arranged at a position where the whole area of the conveyed document is in contact with the conductive conveyance guide 161a on the upstream side of the reading position 160 of the feeding-reading platen 161 in the document conveyance direction.

Further, the present exemplary embodiment has a configuration in which the feeding-reading platen 161 is earthed. Therefore, the frictional charge can be reduced near the friction portion (static electricity generation area) of the document P with the feeding-reading platen 161. Further, the charge of the document and the dust can be actively eliminated. Moreover, since there is hardly any deterioration or peeling of the EC coat near the reading position even for repeated document passage, the static elimination performance can be maintained for a long time.

Consequently, the adherence of the dust G near the reading position of the feeding-reading platen 161 can be prevented, and the occurrence of streaky images can be stably prevented.

To improve the reading efficiency of a double-sided document, a reader unit which reads the back side of the document may be separately provided in the ADF 2 to allow both sides of the document to be read in one pass. In such a configuration, the reader unit for reading the back side can still obtain the same effects by providing the structure of the feeding-reading platen 161 including the conductive conveyance guide of the present exemplary embodiment in the conveyance path of the ADF 2 as a reversed vertical manner.

Figure 10A:
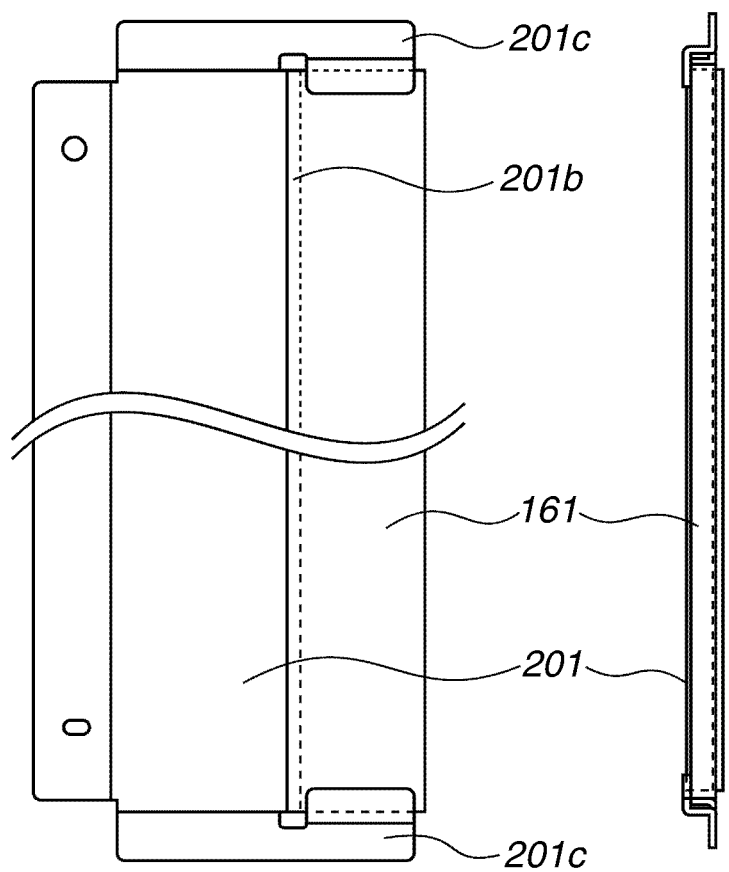
FIGS. 10A and 10B illustrate details of a document reader unit according to another exemplary embodiment of the present invention.
Figure 10B:
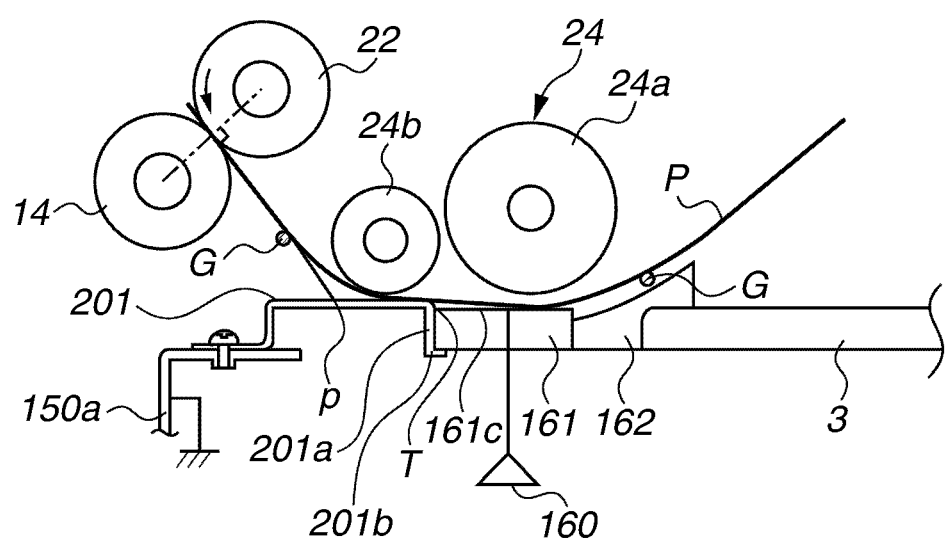

Other exemplary embodiments of the image reading apparatus according to the present invention will now be described referring to the FIGS. 9, 10A, and 10B. FIG. 9 is a cross-sectional view of the image reading apparatus according to another exemplary embodiment. FIGS. 10A and 10B are detailed views of adjacent portions of the image reading position illustrated in FIG. 9. Parts, which are same as those of the first exemplary embodiment are provided with the same reference numerals, and a description thereof is omitted.

In FIG. 9, a double-sided path switch member 9 is attached in a freely swinging manner to the shaft of the read discharge roller 23. The double-sided path switch member 9 rotates in a clockwise direction to switch the path when the document is conveyed to a double-sided path 19 so that both sides of the document can be read.

The configuration around the reading position will now be described. In the first exemplary embodiment, the conductive conveyance guide 161a is adhered on the upper face of the feeding-reading platen 161. On the other hand, as illustrated in FIGS. 9, 10A, and 10B, in the image reading apparatus according to the present exemplary embodiment, a conductive conveyance guide member 201 holds the feeding-reading platen 161.

The upper face of the conductive conveyance guide member 201, which is the document guide face, intersects the nip line of the read roller pair 22 and 14 along the upper face of the feeding-reading platen 161. This point is similar to the first exemplary embodiment.

In the present exemplary embodiment, similar to the first exemplary embodiment, the height of the guide face side of the conductive conveyance guide member 201 is arranged about 0.2 to 0.4 mm above the height of the upper face of the feeding-reading platen 161.

In the present exemplary embodiment, the conductive conveyance guide member 201 includes a bent portion 201a, which is bent downwards. A tip of the bent portion 201a is bent in a horizontal direction to form a holding member 201b for holding the feeding-reading platen 161 by an upper face.

The conductive conveyance guide member 201 is earthed by being fixed with a screw to an earthed chassis 150a at the opposite side of the feeding-reading platen 161. The conductive conveyance guide member 201 includes extended members 201c extending from the near side and the far side.

The extended members 201c are in contact with the EC coat (conductive layer) of the feeding-reading platen 161, and ensure conduction with the EC coat 161c. The two extended members 201c are arranged outside the document passage area.

Consequently, in addition to obtaining similar effects as the above-described first exemplary embodiment, the configuration of the reader unit, which is configured from a plurality of parts, can be simplified. Further, production costs can also be reduced, since the width of the feeding-reading platen can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-311232 filed Dec. 5, 2008, which is hereby incorporated by reference herein in its entirety.

What is claimed is:

1. An image reading apparatus comprising:
a conveyance unit configured to convey a document;
a reader unit configured to read an image of the document at a reading position;
a transparent member arranged at the reading position and including a conductive layer on a surface of the transparent member; and
an earthed conductive guide member provided along the surface of the transparent member and having a flat surface positioned so as to intersect with a conveyance direction of the document conveyed by the conveyance unit and configured to contact to deform the document conveyed by the conveyance unit so that the document moves along the flat surface of the conductive guide member,
wherein the conductive layer is earthed via the conductive guide member.

2. The image reading apparatus according to claim 1, wherein the flat surface of the conductive guide member guides the document conveyed by the conveyance unit toward the reading position, and the flat surface of the conductive guide member for guiding the document extends parallel to the surface of the transparent member.

3. The image reading apparatus according to claim 1, wherein the conveyance unit includes a roller pair, and a nip line of the roller pair and the conductive guide member intersect with each other.

4. The image reading apparatus according to claim 1, further comprising a regulation unit arranged to face the conductive guide member and configured to regulate the position of the conveyed document so that the document conveyed by the conveyance unit is not separated from the conductive guide member.

5. The image reading apparatus according to claim 1, further comprising a roller arranged to face the conductive guide member, wherein the document is conveyed between the rotating member and the conductive guide member.

6. The image reading apparatus according to claim 1, wherein the conductive layer of the transparent member is formed by coating with a conductive coating.

7. The image reading apparatus according to claim 1, wherein an electrical resistance of the conductive guide member is smaller than an electrical resistance of the conductive layer of the transparent member.

8. The image reading apparatus according to claim 1, further comprising a curved conveyance path along which the document is conveyed and arranged on an upstream side of the reading position in the conveyance direction of the document.

9. The image reading apparatus according to claim 1, wherein the conductive guide member is a metal plate.

10. The image reading apparatus according to claim 1, wherein the conductive guide member and a face formed with the conductive layer of the transparent member are adhered by a conductive adhesive member.

11. The image reading apparatus according to claim 1,
wherein an end portion of the conductive guide member on the downstream side in the conveyance direction of the document has a symmetrical shape about a conveyance center in a width direction, which intersects with the conveyance direction of the conveyed document, and
wherein regarding an end portion of the conductive guide member on the downstream side in the conveyance direction of the document, on one side with respect to the conveyance center in the width direction, the end portion position in the conveyance direction is different across the width direction.

12. The image reading apparatus according to claim 1, wherein an end portion of the conductive guide member on the downstream side in the conveyance direction of the document is positioned upstream relative to the reading position.

13. The image reading apparatus according to claim 1, wherein the conveying direction of the conveyance unit intersects with the conductive guide member so that the document conveyed by the conveyance unit contacts the conductive layer before the document contacts the surface of the transparent member.

14. An image reading apparatus comprising:
a reader unit configured to read an image of the document at a reading position;
a transparent member arranged at the reading position and including a conductive layer on a surface of the transparent member;
a conveyance unit configured to convey a document;
a roller provided between the conveyance unit and the reading position and guiding the conveyed document; and
an earthed conductive guide member provided along the surface of the transparent member and positioned between the roller and the transparent member, the conductive guide member being positioned so as to intersect with a conveyance direction of the document conveyed by the conveyance unit and configured to contact to deform the document conveyed by the conveyance unit so that the document moves along the conductive guide member,
wherein the conductive layer is earthed via the conductive guide member.

15. The image reading apparatus according to claim 14, wherein the conveyance unit includes a roller pair, and a nip line of the roller pair and the conductive guide member intersect with each other.

16. The image reading apparatus according to claim 14, wherein the conductive layer of the transparent member is formed by coating the transparent member with a conductive coating.

17. The image reading apparatus according to claim 14, wherein an end portion of the conductive guide member on the downstream side in the conveyance direction of the document is positioned upstream relative to the reading position.

18. The image reading apparatus according to claim 14, wherein the conveying direction of the conveyance unit intersects with the conductive guide member so that the document conveyed by the conveyance unit contacts the conductive layer before the document contacts the surface of the transparent member.

* * * * *